Oct. 6, 1964        R. J. KOUTNIK        3,151,624
                    SHUTTLE VALVE
Filed Jan. 11, 1963                    2 Sheets-Sheet 2
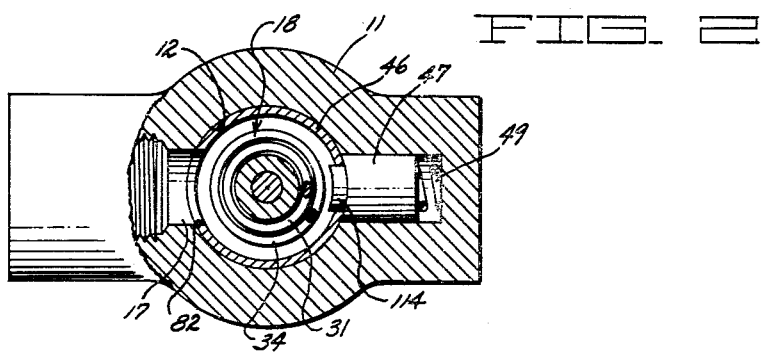
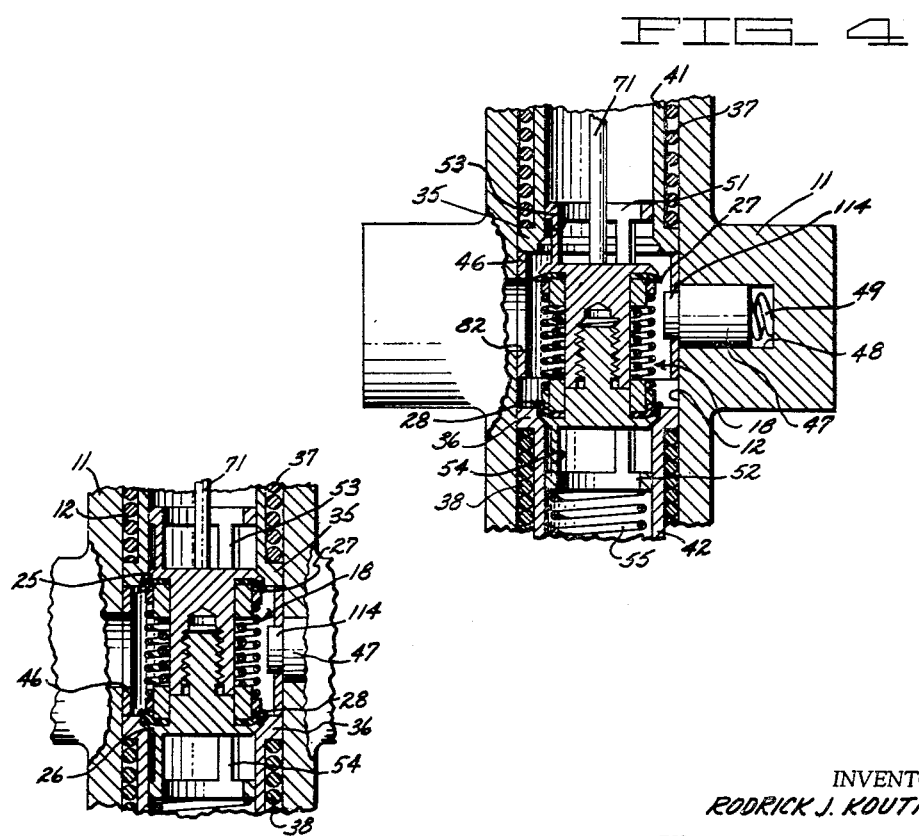
INVENTOR.
RODRICK J. KOUTNIK
BY
ATTORNEY

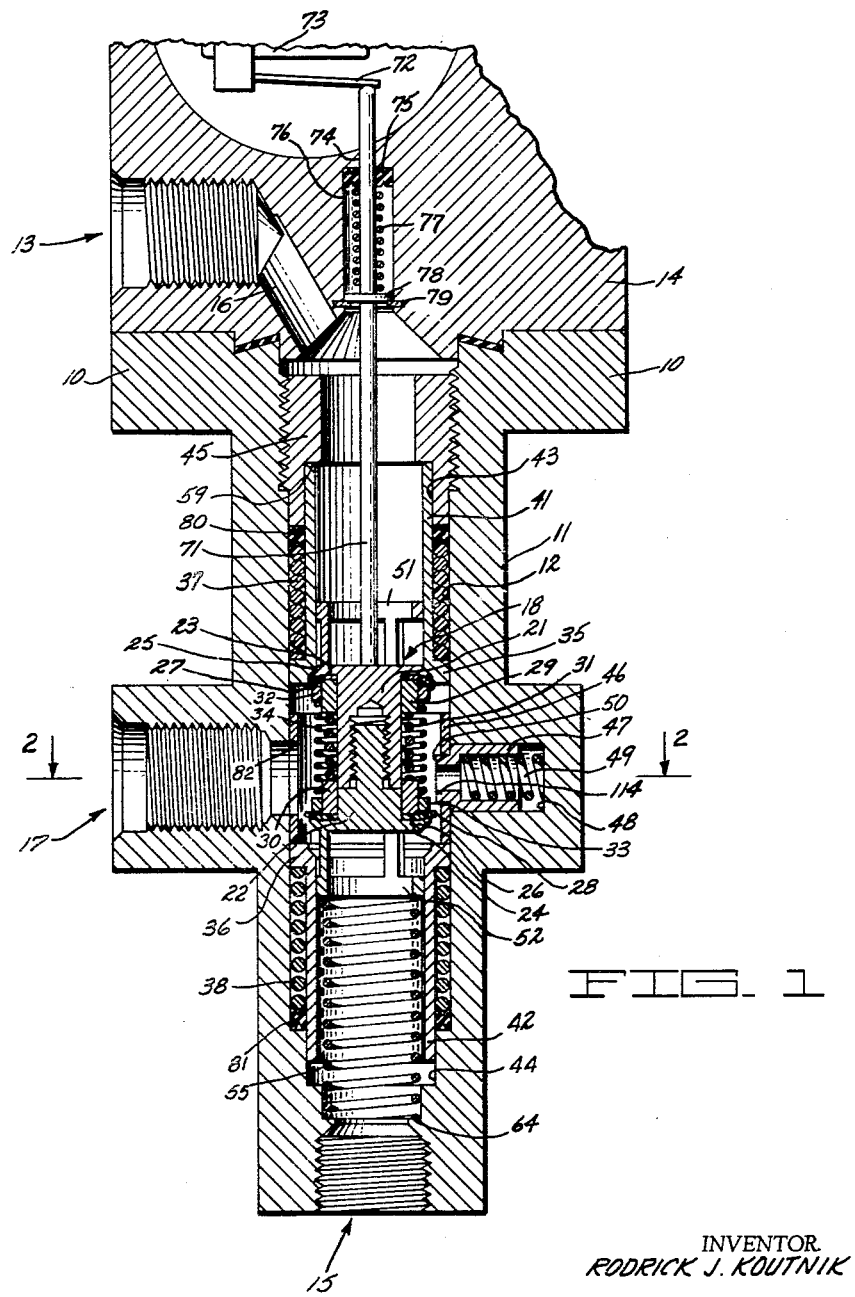

United States Patent Office 3,151,624
Patented Oct. 6, 1964

3,151,624
SHUTTLE VALVE
Rodrick J. Koutnik, Vista, Calif., assignor to Clary Corporation, San Gabriel, Calif., a corporation of California
Filed Jan. 11, 1963, Ser. No. 250,873
1 Claim. (Cl. 137—112)

The present invention relates to shuttle valves and more particularly to a type of shuttle valve which provides a non-interflow feature.

A problem frequently encountered in shuttle valves is the intermixing of fluids or back flow occurring during the shifting of the shuttle element from one to the other of its positions.

Therefore one of the main objects of the present invention is to provide a shuttle valve which will positively seal off a first inlet port before opening a second inlet port.

Another object is to facilitate assembly and disassembly of a shuttle valve.

Another object is to provide a shuttle valve capable of handling fluids under relatively high pressures and relatively large temperature ranges.

The manner in which the above and other objects of the invention are accomplished will be readily understood on reference to the following specification when read in conjunction with the accompanying drawings, wherein:

FIG. 1 is a vertical sectional view through a shuttle valve embodying a preferred form of the present invention.

FIG. 2 is a transverse sectional view taken along the line 2—2 of FIG. 1.

FIGS. 3 and 4 are fragmentary views, similar to FIG. 1, showing the shuttle element in different positions.

Referring to FIGS. 1 and 2 of the drawings, there is shown a substantially cylindrically shaped valve body 11 having an axially aligned bore 12 extending therethrough.

An upper extension 14 bolted to the body 11 through flanges 16 has an inlet passage 13 therein which lies in a plan transverse to the bore 12, and is connected to the bore through a channel 16. The bore 12 terminates at its end opposite the extension 14 in a second inlet passage 15 which is axially aligned with the bore.

An outlet passage 17 in the body 11 is positioned intermediate the inlet passages 13 and 15 and extends transverse to the bore 12 while intersecting the bore adjacent a shuttle valve element, generally indicated at 18. The latter is movable longitudinally in the bore intermediate the inlet passages.

The shuttle element 18 is formed of two parts 21 and 22 screw threaded together. At the ends opposite the threads, the parts have annular walls comprising radially extending inner wall sections 23 and 24 which are coextensive with outer conical wall sections 25 and 26, respectively.

Thin annular closure seals 27 and 28 are formed of a flexible plastic material such as that known in the art as "Mylar," and are clamped against wall sections 23 and 24 through annular rings 29 and 30, respectively, by a compression spring 31 compressed intermediate the rings.

A second pair of annular rings 32 and 33 are slideably mounted on the rings 29 and 30 and, through a compression spring 34 mounted therebetween, are pressed against the respective seals 27 and 28 to hold the outer portions of the seals against the conical wall section 25 and 26, respectively.

Positioned on opposite sides of the shuttle element 18 are annular valve seating members 35 and 36 which are slideable in the bore 12 and are spring urged towards the shuttle element by compression springs 37 and 38, respectively. The latter seat against sliding seals 80 and 81, respectively, of plastic or the like.

The seating members 35 and 36 have annular seating shoulders engageable with the seals 27 and 28 and, in addition, have sleeve portions 41 and 42 which ride in guide surfaces 43 and 44, respectively, of which the guide surface 44 is a reduced section of the bore 12, while the guide surface 43 is formed in an insert 45 which is threaded into the bore.

An annular stop member or sleeve 46 is slideably mounted in the bore 12 and is located directly opposite the outlet 17, intermediate the seating members 35 and 36, by a hollow locking pin 47. The latter is slideably mounted in a well 48 formed in the valve body and aligned with the outlet 17 so that, through a compression spring 49, the pin is urged to engage a nose piece 114 thereon in locking engagement with a hole 50 in the sleeve. The sleeve limits travel of the member 35 and 36 by their respective springs 37 and 38 and is provided with a second hole 82 which is aligned with the outlet port 17.

The shuttle element 18 is guided for axial movement by guide rings 51 and 52 which are extended from the annular walls of the element 18 by legs 53 and 54, respectively. The rings 51 and 52 slide along the inner peripheries of the sleeves 41 and 42, respectively, upon movement of the shuttle element.

A compression spring 55, which is relatively stronger than spring 37, is compressed between the guide ring 52 and a radially inwardly extending wall 64 on the body 11 to normally hold the shuttle element 18 in sealing engagement with the seating member 35 and to hold the seating member away from outlet 17 and in a position where it rests against an annular stop shoulder 59 formed in the inner periphery of the insert 45.

Accordingly, the spring 37 is normally compressed while the spring 38 is expanded to hold the seating member 36 against the stop member 46.

The shuttle element 18, having moved its seal 28 from sealing engagement with the seating member 36 allows fluid to pass from the inlet 15 to the outlet 17.

When fluid pressure in the inlet 13 exceeds that developed in the inlet passage 15 (in addition to the force developed by spring 55) the fluid from inlet 13 will push the shuttle element towards seating element 36. However, the compression spring 37 will cause the seating element 35 to follow in sealing engagement with the seal 27 until the seating element 35 abuts the stop member 46, by which time the seal 28 will have seated against seating element 36, thus preventing any further flow through inlet 15.

In FIG. 3 it can be seen that at the point last described, fluid flow from both inlets is stopped and that interflow between the two inlets is prevented.

Continued fluid pressure in the inlet 13 will move the shuttle element away from the seating element 35 and into the position shown in FIG. 4, compressing the springs 38 and 55 until the seating element 36 abuts an annular stop shoulder 64 formed on the inner periphery of the body 11, thereby allowing flow from inlet 13 through seating member 35 to outlet 17.

From the foregoing, it will be seen that interflow between the inlet passages will be prevented upon shifting of the shuttle element between its two limit positions in either direction.

In FIG. 1 is shown a slender rod 71 attached to the shuttle element, concentric of the bore 12, and extending up through the bore 12 and through a bearing 74 in the extension 14, to actuate the tongue 72 of a switch 73. A seal 75 surrounding the rod at the end of a bore 76 is retained in place by a compression spring 77 which is compressed by a flange 78 retained in the bore 76 by a snap ring 79.

As the shuttle element moves from one position to the other, the switch will be alternately opened and closed to indicate to an operator the position of the shuttle element.

Although the invention has been described in detail and certain specific terms and languages have been used, it is to be understood that the present disclosure is illustrative rather than restrictive and that changes and modifications may be made without departing from the spirit or scope of the invention as set forth in the claim appended hereto.

Having thus described the invention, what is desired to be secured by United States Letters Patent is:

A shuttle valve comprising a valve body having a bore, an outlet passage opening into said bore intermediate the ends thereof, and first and second inlet passages opening into said bore at opposite sides of said outlet passage; a first annular seating member slideable in said bore intermediate said outlet passage and said first inlet passage, said bore having a small diameter portion slideably supporting a first part of said seating member and a large diameter portion slideably supporting a second part of said seating member, said body forming a shoulder intermediate said large and small diameter portions, a sliding seal of resilient material in said large diameter portion, said seal slideably engaging said seating member, a compression spring in said large diameter portion urging said seal against said shoulder, said spring urging said seating member toward said outlet passage, a second annular seating member slideable in said bore intermediate said outlet passage and said second inlet passage, said large diameter portion of said bore slideably supporting a first part of said second seating member, said bore having a second small diameter portion slideably supporting a second part of said second seating member, said body having a second shoulder intermediate said second small diameter portion and said large diameter portion; a second sliding seal of resilient material in said large diameter portion, a second compression spring in said large diameter portion urging said second seal against said second shoulder, said second spring urging said second seating member toward said outlet passage, a shuttle valve element slideable in said seating members, said valve element having a first valve seat engageable with said first seating member to seal off said first inlet passage from said outlet passage, said valve element having a second valve seat engageable with said second seating member to seal off said second inlet passage from said outlet passage, said springs causing said seating members to normally follow in engagement with respective ones of said valve seats upon movement of said valve element along said bore, and stop means, said stop means limiting movement of said second seating member whereby to disengage said second seating member from said second valve seat only after said first seat engages said first seating member upon movement of said valve element away from said second inlet passage, and said stop means limiting movement of said first seating member whereby to disengage said first seating member from said first valve seat only after said second seat engages said second seating member upon movement of said valve element away from said first inlet passage.

References Cited in the file of this patent
UNITED STATES PATENTS

| | | |
|---|---|---|
| 2,635,846 | Smith | Apr. 21, 1953 |
| 2,643,090 | Cluphf | June 23, 1953 |
| 2,821,972 | Banker | Feb. 4, 1958 |
| 2,837,114 | Ruhl | June 3, 1958 |

FOREIGN PATENTS

| | | |
|---|---|---|
| 83,990 | Denmark | Dec. 2, 1957 |